United States Patent [19]
Kudoh et al.

[11] Patent Number: 5,767,787
[45] Date of Patent: Jun. 16, 1998

[54] REDUCED SIZE RADIO SELECTIVE CALL RECEIVER WITH A TACTILE ALERT CAPABILITY BY SUB-AUDIBLE SOUND

[75] Inventors: Kazuhiro Kudoh, Tokyo; Shigeki Minata, Shizuoka, both of Japan

[73] Assignee: NEC Corporation, Tokyo, Japan

[21] Appl. No.: 423,453

[22] Filed: Apr. 19, 1995

Related U.S. Application Data

[63] Continuation of Ser. No. 13,794, Feb. 5, 1993, abandoned.

[30] Foreign Application Priority Data

Feb. 5, 1992 [JP] Japan ................ 4-019699

[51] Int. Cl.$^6$ ........................................... H04Q 1/30
[52] U.S. Cl. ........................................... 340/825.46
[58] Field of Search ........................ 340/825.46, 825.47

[56] References Cited

U.S. PATENT DOCUMENTS

| | | | |
|---|---|---|---|
| 3,937,004 | 2/1976 | Natori et al. | 340/825.44 |
| 4,383,139 | 5/1983 | Kanchev | 381/191 |
| 4,419,545 | 12/1983 | Kuindersma | 381/191 |
| 5,023,504 | 6/1991 | Mooney et al. | 340/825.46 |
| 5,172,092 | 12/1992 | Nguyen et al. | 340/311.1 |
| 5,181,023 | 1/1993 | Fujii | 340/825.46 |

*Primary Examiner*—Mark R. Powell
*Attorney, Agent, or Firm*—Sughrue, Mion, Zinn, Macpeak & Seas, PLLC

[57] ABSTRACT

A radio selective call receiver that alerts a user to reception of a call signal by mechanical vibration achieves miniaturization and reduction in thickness by using a sounding body as a reception informing means. The sounding body is selected among reception informing means by a switch. The sounding body generates a non-audio frequency, thus preventing the mechanical vibration from producing an undesired sound. The bottom of the receiver is adapted to be in close contact with a human body wearing the receiver. When a call signal is received, the sounding body oscillates at the non-audio frequency, the sound wave passes through slits to cause vibration, and the user carrying the receiver is alerted tactilely that a call signal is being received.

2 Claims, 5 Drawing Sheets

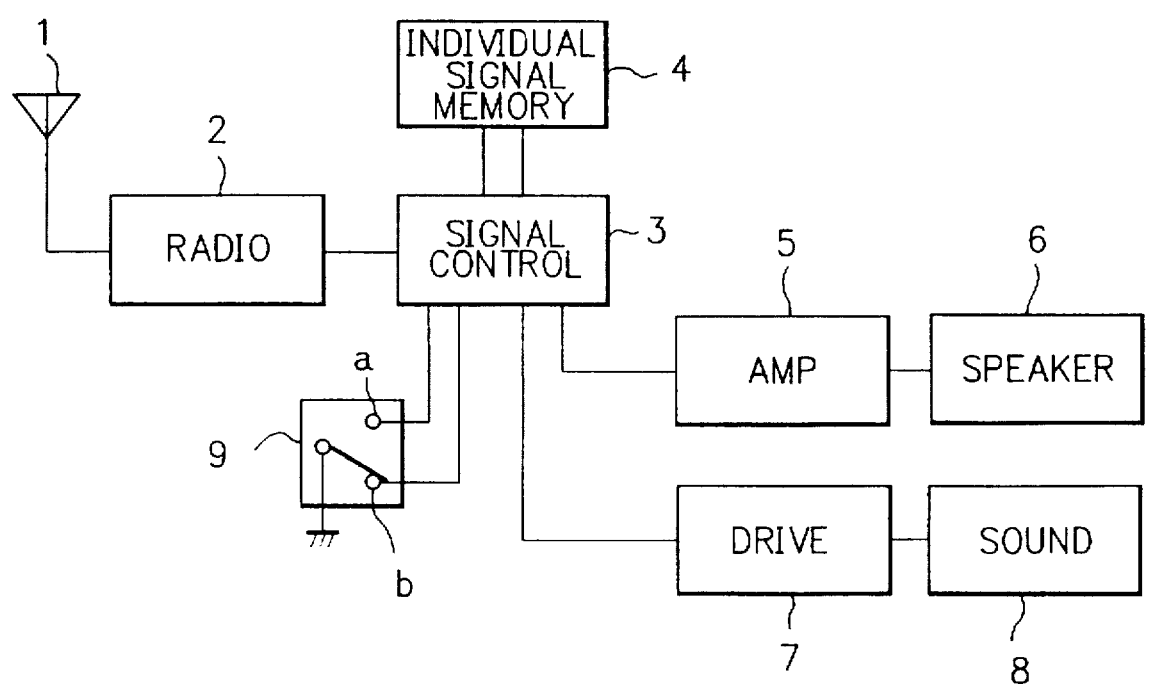
F I G. 1

REDUCED SIZE RADIO SELECTIVE CALL RECEIVER WITH A TACTILE ALERT CAPABILITY BY SUB-AUDIBLE SOUND

This is a Continuation application of Ser. No. 08/013,794 which was filed on Feb. 5, 1993 now abandoned.

BACKGROUND OF THE INVENTION

The present invention relates to a radio selective call receiver, and more particularly to a radio selective call receiver having a reception informing device.

DESCRIPTION OF THE RELATED ARTS

FIG. 6A is a block diagram of a conventional radio selective call receiver and FIG. 6B is a perspective view of the same. A radio call signal received by an antenna 1 is input to a radio part 2, and the radio part 2 amplifies, frequency-converts and demodulates the radio call signal to output a demodulated signal to a signal control part 3. The signal control part 3 compares the demodulated signal with a content of a call signal read out of an individual signal memory part 4, and when both the signals are coincident with each other, the signal control part 3 supplies a reception informing signal to a reception informing means by a switch 9.

The reception informing means includes a singing informing means composed of a singing amplifier 5 and a speaker 6 and a vibration informing means composed of a motor driving part 10 and a motor 11.

In the above-described conventional radio selective call receiver, the motor 11, which functions as a reception informing means by generating a mechanical vibration as it rotates must genetate a vibration large enough to be sensed by the user carrying the receiver. Hence, the motor 11 becomes large, and thus it is difficult to miniaturize and thin the receiver.

Further, since the motor 11 is contained within the apparatus, the motor 11 is resonated with a printed board (not shown) or a case 12, and in spite of the soundless informing means, an undesired sound is generated.

SUMMARY OF THE INVENTION

It is therefore an object of the present invention to provide a radio selective call receiver that can overcome the aforementioned problems of the prior art. It is a further object of the invention to provide a radio selective call receiver that is capable of preventing generation of an undesired sound and achieving miniaturization and thinning of the receiver without using a motor.

In accordance with one aspect of the present invention, there is provided a radio selective call receiver, comprising: means for detecting a received radio call signal and reception informing means for tactilely transmitting a sound wave having a non-audio frequency to a close contact part, the sound wave being generated by a sounder when the call signal is detected.

The sounder can be an electrostatic sounding body. The sounding can be driven by a sounding body driver.

BRIEF DESCRIPTION OF THE DRAWINGS

The objects, features and advantages of the present invention will become more apparent from the consideration of the following detailed description, taken in conjunction with the accompanying drawings, in which:

FIG. 1 is a block diagram of one embodiment of a radio selective call receiver according to the present invention;

DESCRIPTION OF THE PREFERRED EMBODIMENTS

Figure 2:
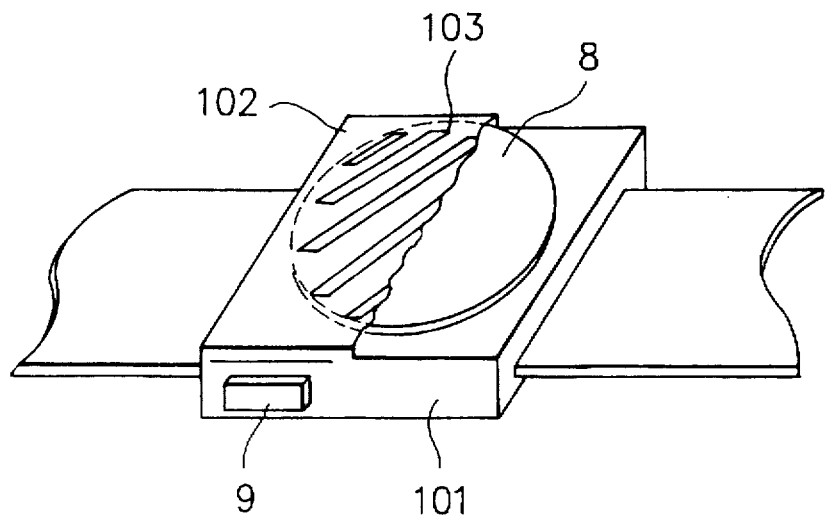
FIG. 2 is a perspective view showing the bottom of the radio selective call receiver shown in FIG. 1.

Referring now to the drawings, wherein like reference characters designate like or corresponding parts throughout the views and thus the repeated description thereof can be omitted for brevity, there is shown in FIG. 1 one embodiment of a radio selective call receiver according to the present invention.

In FIG. 1, a radio call signal received by an antenna 1 is input to a radio part 2, and the radio part 2 amplifies, frequency-converts and demodulates the radio call signal to output a demodulated signal to a signal control part 3. The signal control part 3 compares the demodulated signal with a call signal read out of an individual signal memory part 4, and when both the signals are coincident with each other, the signal control part 3 outputs a reception informing signal.

Usually, in the receiver of this kind, by a switch 9, a reception informing means can be selected. In this embodiment, by turning over the switch 9 to a terminal a, the reception informing signal is supplied to a singing amplifier 5. The singing amplifier 5 amplifies the signal and the amplified signal is inputted to and drives a speaker 6. On the other hand, when the switch 9 is turned over to a terminal b, the reception informing signal is supplied to a sounder body driving part 7 and the sounding body driving part 7 drives a sounding body 8.

In this case, since the speaker 6 is driven at an audio frequency (for example, 2.7 KHz), a sound output by the speaker 6 is heard as an informing singing. In contrast, since the sounder 8 is driven at a sub-audible frequency, no sound is heard.

FIG. 2 shows the bottom surface of a wristwatch type of the radio selective call receiver shown in FIG. 1. The sounder 8 is mounted on a bottom 102 of a case 101 so as to tightly contact therewith. The bottom 102 is formed with slits 103 for enabling propagation a sound wave of the sub-audible frequency generated by the sounder body 8 to the outside. In this embodiment the receiver is worn on an arm, its bottom 102 in close contact with the arm.

When a carrier of the receiver operates the switch 9 to select a reception informing means by the sounder 8 and carries out the receiving, the sounder 8 is driven to generate the sound wave of the sub-audible frequency. Thus, the sound wave passes through the slits 103 causing vibration on the arm. Hence, the user carrying of the receiver senses the reception informing tactilely by the vibration caused by the sound wave, and as a result, the user is made aware of receiving.

Figure 3:
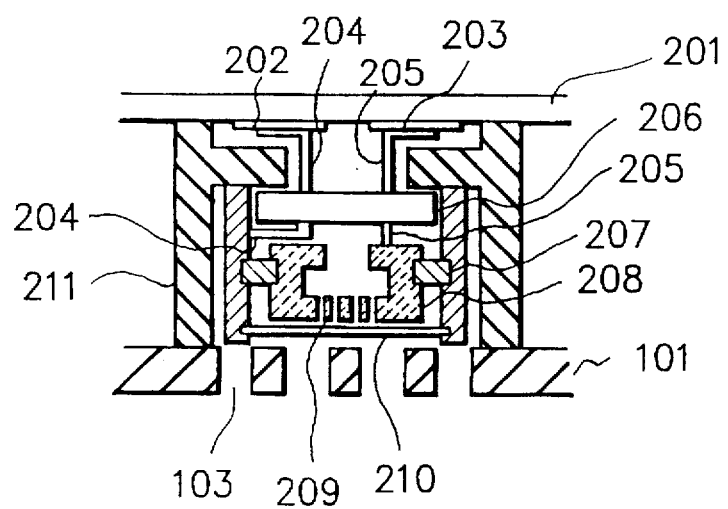
FIG. 3 is a cross sectional view of a sub-audible frequency sounder shown in FIG. 2.

FIG. 3 is a cross section of the sounder 8. In this case, the sounder 8 comprises by an electrostatic sounder.

A printed circuit board 201 includes a low-impedance driving part 7 for the sounder 8, and printed patterns 202 and 203 for a pair of output terminals of the circuit 7. The patterns 202 and 203 are electrically connected to an outer cylindrical fixed electrode 207 and an inner annular back electrode 208 through conductors 204 and 205, respectively. The fixed electrode 207 and the back electrode 208 which are mechanically connected to each other via a number of insulator spacers 212, and an air gap secured between them constitutes an electro-acoustic transducer or a capacitor. An impedance matching element 206 is connected between the conductors 204 and 205 to match the output impedance of the driving part 7 with the input impedance of the electro-acoustic transducer in order to minimize power consumption. The impedance matching element 206 may be a single resistor. The back electrode 208 is provided with a plurality of slits 209. A diaphragm film 210 is arranged near the back electrode 208 at an interval of approximately several tens of µm and is mounted to the fixed electrode 207. Further, an external part of the sounder 8 is protected by a molding 211, and the molding 211 is constructed so as to perform a positioning of the sounder 8 to the printed board 201 for its mounting and to contact with the case 101. The fixed electrode 207 is fixed to the molding 211.

In operation, if an AC voltage is applied between the fixed electrode 207 and the back electrode 208, then a alternating charging and discharging of electric charges occurs, or an alternating electric field occurs between the electrodes 207 and 208, causing the back electrode 208 (having slits 209) to shrink and expand, and therefore to vibrate. This, in turn, causes a vibration of a volume of air in a resonant chamber defined by an inside wall of the annular back electrode 208. The vibration of electrode 208 is transmitted via many slits 209 at a bottom of the electrode 208 to the diaphragm film 210 as a vibration plate, so that dynamic vibrations of the film 210 are output in the form of waves having a sub-audible frequency through slits 103 at the bottom 102 of the case 101 toward a wrist skin of a person wearing the inventive radio selective call receiver.

Vibration is caused by a resistance due to a fluid friction when the air moves in a narrow space between the diaphragm film 210 and the back electrode 208. At this time, in order to obtain a suitable vibration, the movement of the air is adjusted by providing a plurality of slits 209 in the back electrode 208.

The resonance frequency of the sound wave generated due to the vibration of the diaphragm film 210 and a compliance by the air between the fixed electrode 207 and the molding 211 can be easily determined. The sound wave of the sub-audible frequency generated here can be transmitted as a vibration through the air to the human body of the user wearing the receiver via the slits 103 formed in the case 101, and the carrier of the receiver can recognize the reception informing tactily by the vibration caused by the sound wave.

Figure 4:
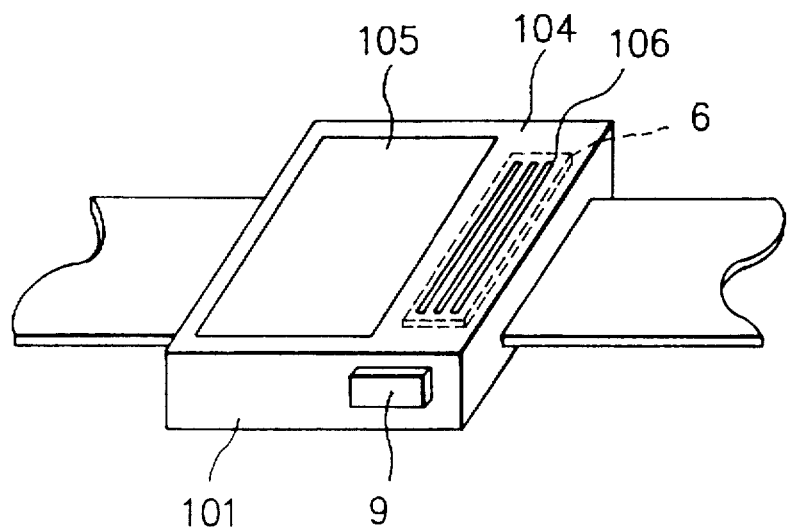
FIG. 4 is a perspective view showing the top of the radio selective call receiver shown in FIG. 2.

FIG. 4 shows the top surface of the wristwatch type of the radio selective call receiver.

In a surface part 104 of the case 101, a display part 105 and slits 106 are provided. The speaker 6 is mounted so as to closely contact with the slits 106. When the user carrying the receiver operates the switch 9 to select the reception informing means by the speaker 6 and execute the receiving, the speaker 6 is driven to generate the singing. The singing passes through the slits 106 to inform the user of the receiving.

Figure 5:
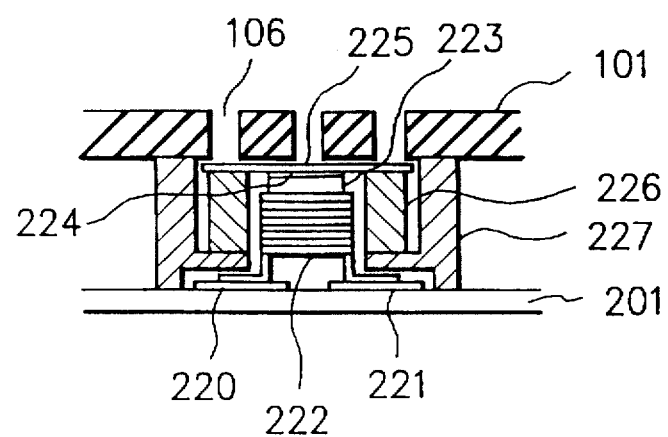
FIG. 5 is a cross sectional view of a speaker shown in FIG. 4.
Figure 6A:
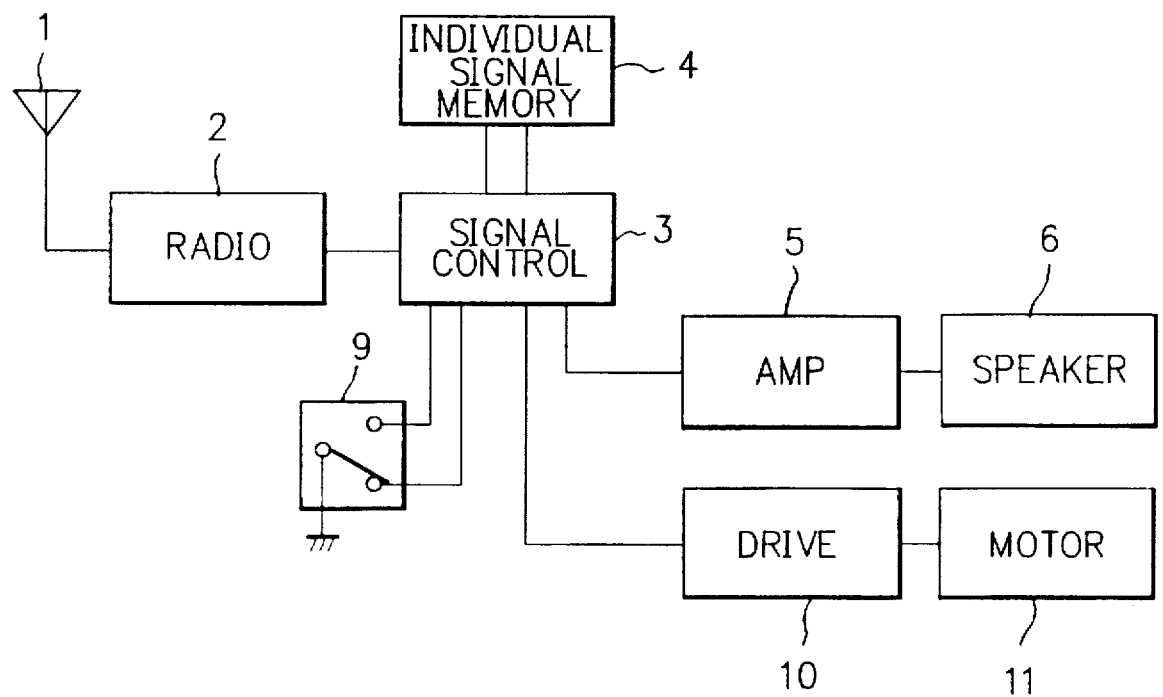
FIG. 6A is a block diagram of a conventional radio selective call receiver and FIG. 6B is a perspective view of the same.
Figure 6B:
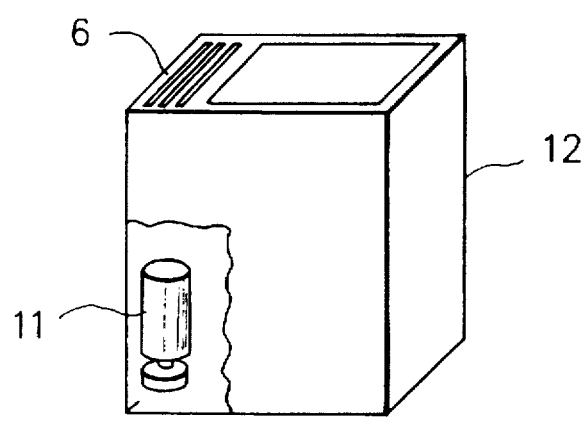

FIG. 5 is a cross section of the speaker 6. In this embodiment, the speaker 6 comprises a small magnetic resonant speaker.

On the printed board 201 carrying on the receiver circuit, patterns 220 and 221 for electrically connecting the speaker 6 are formed. To patterns 220 and 221, both ends of a coil 222 are connected as electrodes by the soldering. On a permanent magnet 223 having a cylindrical form, a cylindrical magnetic pole 224 is put, and the coil 222 is wound around the permanent magnet 223. Further, an annular magnetic pole 226 having a magnetic polarity opposite to the cylindrical magnetic pole 224 is placed so as to surround the coil 222. A circular diaphragm plate 225 is arranged in contact with the magnetic poles 224 and 226. The permanent magnet 223 and the magnetic poles 224 and 226 form a radial magnetic field around the coil 222, and by this radial magnetic field, the circular diaphragm plate 225 is oscillated to generate the sound wave. The generated sound wave is amplified by space of a molding 227 and passes through the slits 106 formed in the case 101 to inform as the singing to the outside.

As described above, according to the present invention, the vibration by the low frequency sound wave generated by the sounder driven by the sub-audible low frequency is sensed tactilely, and no motor is used. Hence, miniaturization and the thinning of the receiver can be achieved. Further, none of the members within the case vibrates so as to generate undesired sound.

Although the present invention has been described in its preferred embodiment with reference to the accompanying drawings, it is readily understood that the present invention is not restricted to the preferred embodiment and that various changes and modifications can be made by those skilled in the art without departing from the spirit and scope of the present invention.

What is claimed is:

1. A radio selective call receiver, comprising:

a means for supplying, in response to reception of a call addressed to a user, a call reception signal;

a means for providing, in response to said call reception signal, tactile stimulation to said user by means of a sub-audible sound;

means for generating said sub-audible sound; and means for generating said sub-audible sound; and means for propagating said sub-audible sound;

wherein said means for generating said sub-audible sound comprises:

an outer cylindrical electrode fixed to a vibration free case;

an inner cylindrical electrode having a plurality of slits formed in parallel in an unfixed end thereof;

means for supplying a voltage having a frequency lower than an audible frequency between said outer and inner cylindrical electrodes.

2. A radio selective call receiver, comprising:

a means for supplying, in response to reception of a call addressed to a user, a call reception signal;

a means for providing, in response to said call reception signal, tactile stimulation to said user by means of a sub-audible sound;

means for generating said sub-audible sound; and means for propagating said sub-audible sound;

wherein said means for propagating said sub-audible sound comprises:

a film means spread and fixed on a free end of said outer cylindrical electrode so as to provide a gap between an inner surface thereof and said unfixed end of said inner cylindrical electrode;

wherein said unfixed end of said inner cylindrical electrode is nearer to said user than a fixed end of said inner cylindrical electrode; and wherein said vibration free case has a plurality of slits in a wall for contacting a user.

* * * * *